United States Patent [19]

Hutchison

[11] 4,002,829
[45] Jan. 11, 1977

[54] AUTOSYNCHRONOUS OPTICAL SCANNING AND RECORDING LASER SYSTEM WITH FIBER OPTIC LIGHT DETECTION

[75] Inventor: John Grear Hutchison, Baltimore, Md.

[73] Assignee: W. R. Grace & Co., New York, N.Y.

[22] Filed: Aug. 29, 1974

[21] Appl. No.: 501,638

[52] U.S. Cl. .............................. 358/286; 346/76 L; 358/293; 358/302
[51] Int. Cl.² .................................. H04N 1/02
[58] Field of Search ................ 178/7.6, 7.88, 6.7 R; 346/76 L

[56] References Cited
UNITED STATES PATENTS

| | | | |
|---|---|---|---|
| 3,564,128 | 2/1971 | Hosterman | 178/7.88 |
| 3,573,849 | 4/1971 | Herriot | 178/6.7 R |
| 3,647,956 | 3/1972 | Buck | 178/7.6 |
| 3,720,785 | 3/1973 | Van Auken | 346/76 L |
| 3,729,248 | 4/1973 | Beduchaud | 178/7.6 |
| 3,739,095 | 6/1973 | Alden | 178/7.6 |
| 3,816,652 | 6/1974 | Barnett | 178/7.6 |
| 3,836,709 | 9/1974 | Hutchison | 178/6.7 R |

OTHER PUBLICATIONS

"Lasers in the Print Shop" Rudolph P. Guzik, July 1974, Electro–Optical Systems Design.

*Primary Examiner*—Robert L. Griffin
*Assistant Examiner*—Michael A. Masinick
*Attorney, Agent, or Firm*—William Kovensky

[57] ABSTRACT

Apparatus and methods for making displays, printing plates, electrical circuit boards, and generally reproductions of originals in reduced, enlarged or full size comprising generating a collimated beam of interrogating light; optically deviating and raster scanning the beam and a recording beam; and receiving light from the object adjacent the scan line and transmitting said received light to a photodetector to generate an electrical signal representative of the light from the object using a fiber optic line to spot converter. Any photosensitive recording medium; a photocurable composition, a thin metal ablative film, silver halide film, an electrostatically charged photoconductor, thermoplastic deformation material or other physically or chemically alterable media, including ovonic, liquid crystal, photochromic or vesicular films, can be used.

39 Claims, 5 Drawing Figures

AUTOSYNCHRONOUS OPTICAL SCANNING AND RECORDING LASER SYSTEM WITH FIBER OPTIC LIGHT DETECTION

BACKGROUND OF INVENTION

This invention relates to rectilinear laser scanning and recording systems which provide for the rapid scanning and optical recording of alphanumeric and graphic imagery.

This invention relates to a recording system of the scanning laser type in which the object being recorded is illuminated by a moving coherent radiant energy beam. Prior art devices employ lasers and a beam moving means for incrementally illuminating an object, means for collecting reflected radiant energy from the object, and means for permanently recording a pictorial representation of the object in response to reflected radiation.

Such systems are designed to make a photographic recording of an object, such as a composite document containing alphanumeric text and graphic imagery, by means of a collimated radiant energy beam (such as that produced by a laser), which beam is caused to line scan the object, for example, in a rectilinear pattern. The return light may be focussed on a photomultiplier which yields a signal proportional to the reflectivity of each of the incremental areas sequentially illuminated by the laser beam. This electrical signal is then utilized to modulate the intensity of a light beam which is caused to scan a photosensitive film which may be in sheet or web form. By causing the scanning movement of the illuminating light beam and the scanning of the film by the second recording light source to be synchronous, the photographic record can accurately reproduce the object being photographed. This synchronization may be accomplished by utilizing a common optical element (e.g. a rotating multi-sided mirror) to effect the scanning of the object and the scanning of the film substantially simultaneously or with a negligible time lag.

SUMMARY OF THE INVENTION

An optical scanning and recording system has been invented which provides an object to be recorded and a photosensitive image recording medium; a first source of modulatable beam of coherent radiation; a second source of a second beam of radiation having uniform intensity; means for combining said first and second beams of radiation; optical scanning means disposed to receive said combined first and second beams of radiation to provide autosynchronous deflection of said first and second beams of radiation; means for directing said first beam toward a photosensitive medium; means for directing said second beam toward the object to be recorded; means for advancing the object to be recorded and the photosensitive medium in relative linear motion with the optical scanning means in planar relationship to receive radiation; flat field lens means disposed to receive radiation from said optical scanning means and focus said first and second beams of radiation to form diffraction-limited spots along scan lines corresponding to object and image planes; means for separating first and second beams of scanned and focused radiation; and means to direct first and second beams of scanned and focused radiation along paths, whereby said first beam of radiation scans the image plane and said second beam scans the object plane; internal reflection means disposed to receive radiation from the object; photodetector means for generating an electrical signal which varies substantially in proportion to the intensity of radiation received from said internal reflection means; and electrical processing means responsive to the electrical signal for generating an electrical signal for modulating said first beam intensity whereby data representative of the imagery content of said object is recorded.

The methods and apparatus to implement the autosynchronous system preferably employ highly collimated laser beams with a rotating polygon mirror optical scanner and a flat field lens for providing uniformly focussed beams in a rectilinear raster pattern.

The use of fiber optic line-to-spot convertor provides a desirable feedback which is converted to an electrical signal representative of light reflected or transmitted by the object to be copied.

The use of two different wavelengths for the reading (scanning) beam and the writing (recording) beam permits the scanning of the two beams through a single flat field lens with different focal lengths. This can provide change in facsimile size between a paste-up or other object and a printing plate record of the object.

Accordingly, it is a broad object of this invention to provide new and improved systems and components thereof in which lasers and/or laser beams are employed in a novel manner.

Another object of this invention is to provide means and methods for scanning information at high signal to noise ratios and recording with high resolution employing internally reflecting light detection components, such as a fiber optic array.

A still further object of this invention is to provide high resolution recording of full sized objects, in reduced format, without the necessity of forming intermediate photographic or reduced images.

Yet another object of this invention is to provide a laser-imaged printing plate method.

A further object of this invention is to provide a novel, real-time laser display system, laser oscillograph or facsimile recorder.

A still further object of this invention is to provide improved means of making optical masks, for later use for projection or contact imaging.

Yet another object of this invention is to provide means and methods for laser scanning and recording which are reliable, rugged and relatively inexpensive.

Further objects and advantages of the invention will be obvious to one skilled in the art upon reading the following specification in conjunction with the accompanying drawings.

THE DRAWINGS

DESCRIPTION OF PREFERRED EMBODIMENTS

Figure 1:
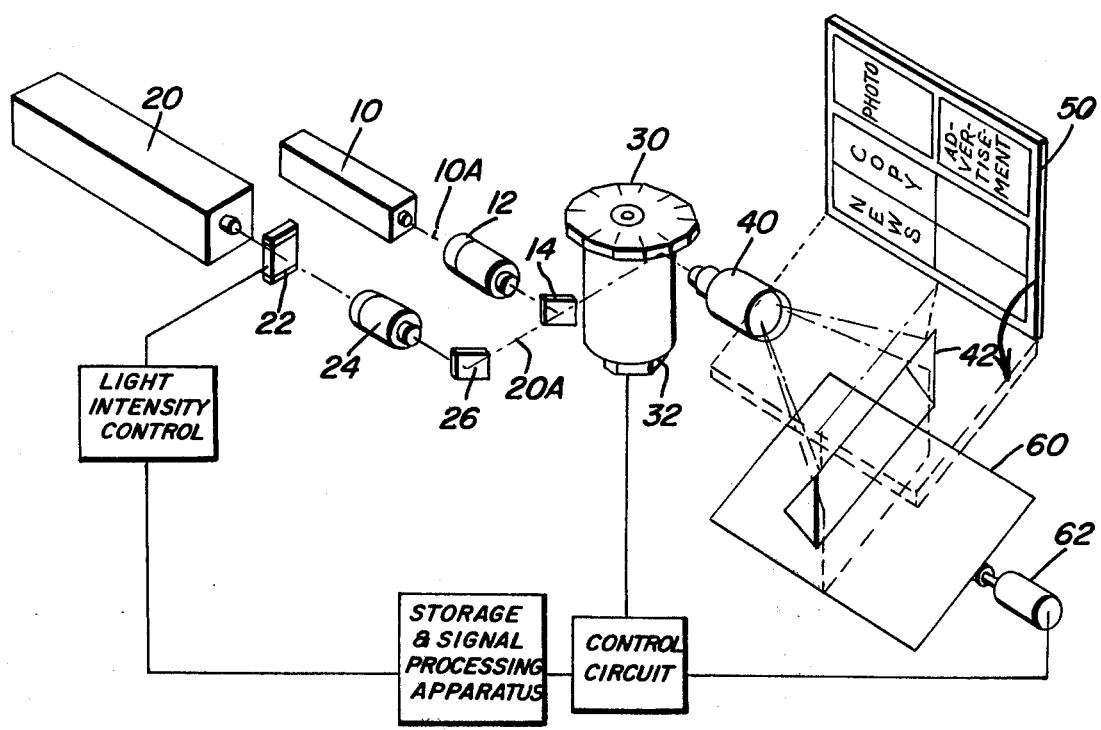
FIG. 1 is a pictorial view of a typical scanning laser system showing components in projection view and schematic diagram.

The invention may take a variety of forms. The following description is intended to set forth certain operative autosynchronous scanning laser systems in a manner to permit one skilled in the art to practice the invention, without limitation to the particular embodiments shown in the drawings or described herein.

Figure 2:
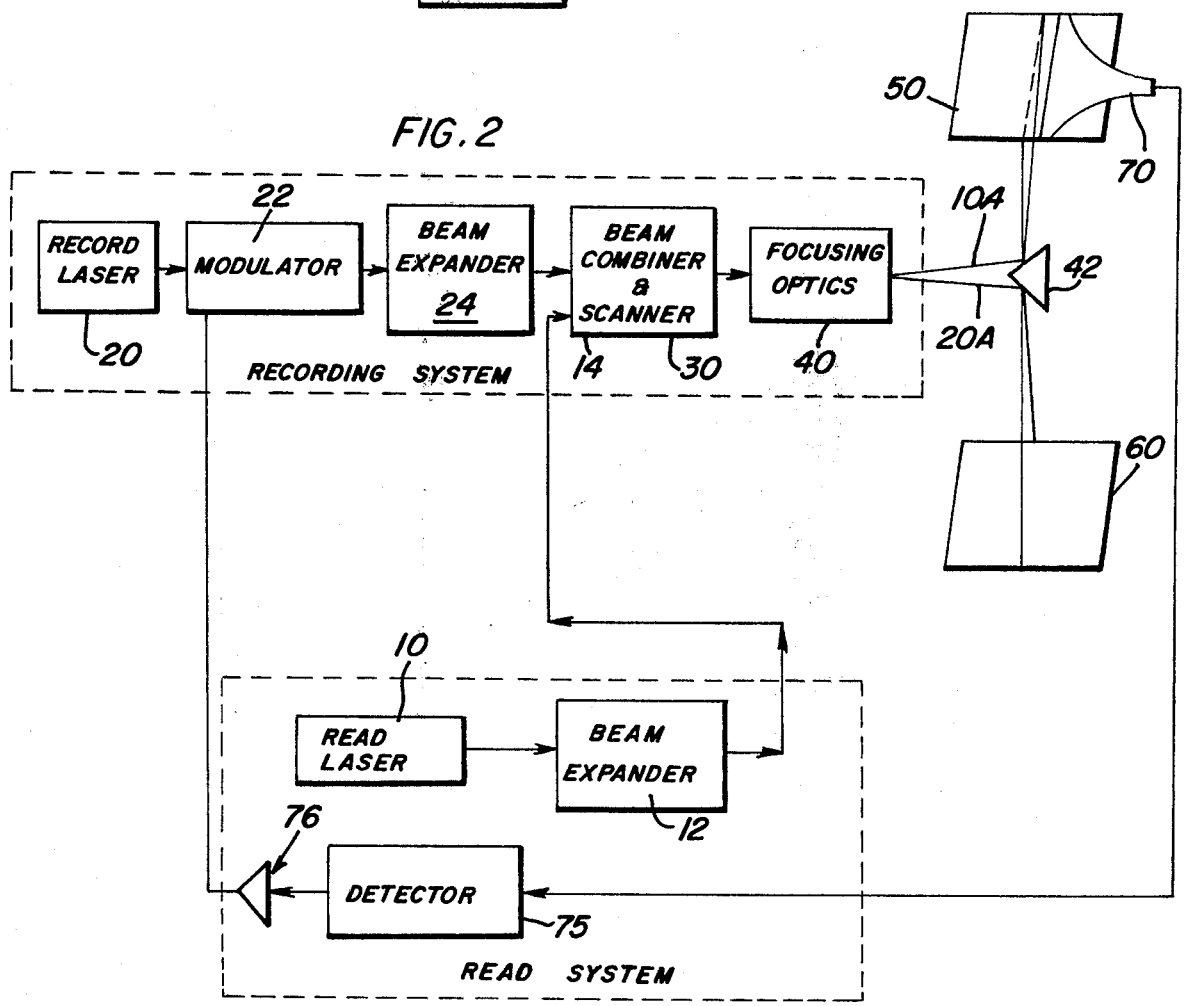
FIG. 2 is a schematic diagram of a preferred embodiment of the invention, showing the relationship of a fiber optic receiver to the system.

Referring to FIGS. 1 and 2 a typical embodiment is depicted of a system for interrogating and recording or displaying high resolution imagery which takes advantage of the properties of scanning lasers in a novel manner.

The system includes laser 10 as a means for producing a bright narrow beam 10A of radiant energy. Optical means 12 are provided for expanding and directing the first radiant energy beam toward a dichroic mirror 14, which provides for beam combining with a second beam 20A of radiant energy. The second beam is produced by laser source 20, which directs beam 20A through modulator 22, beam expander 24 and reflects the beam off folding mirror 26. A rotating polygon mirror 30 driven by motor 32 provides means for simultaneous rectilinear scanning of the "read" and "write" beams. A flat field lens 40 provides means for focusing the two light beams along their scan lines. A dihedral mirror 42 together with the pre-set angles of mirrors 14 and 26, provides the means for spatial separation of the two beams and directing the "read" beam toward an object 50 to be photographed and the "write" beam toward a photosensitive recording medium 60.

The system also includes motor means 62 for controlling the linear movement of the object substrate 50 and the recording medium 60 in relation to the optical scanning and focusing components. The optical components are preferably aligned along an axis defined by the center of planar substrates 50, 60. The flat field lens system is disposed along the optic axis to obtain side-to-side scanning of both substrates 50, 60. The reflecting facet of polygon mirror 30 is aligned with the optic axis and disposed at a distance from flat field lens means 40 to provide focusing of the reflected beams along their respective scan lines on object and image planes 50, 60.

Figure 3:
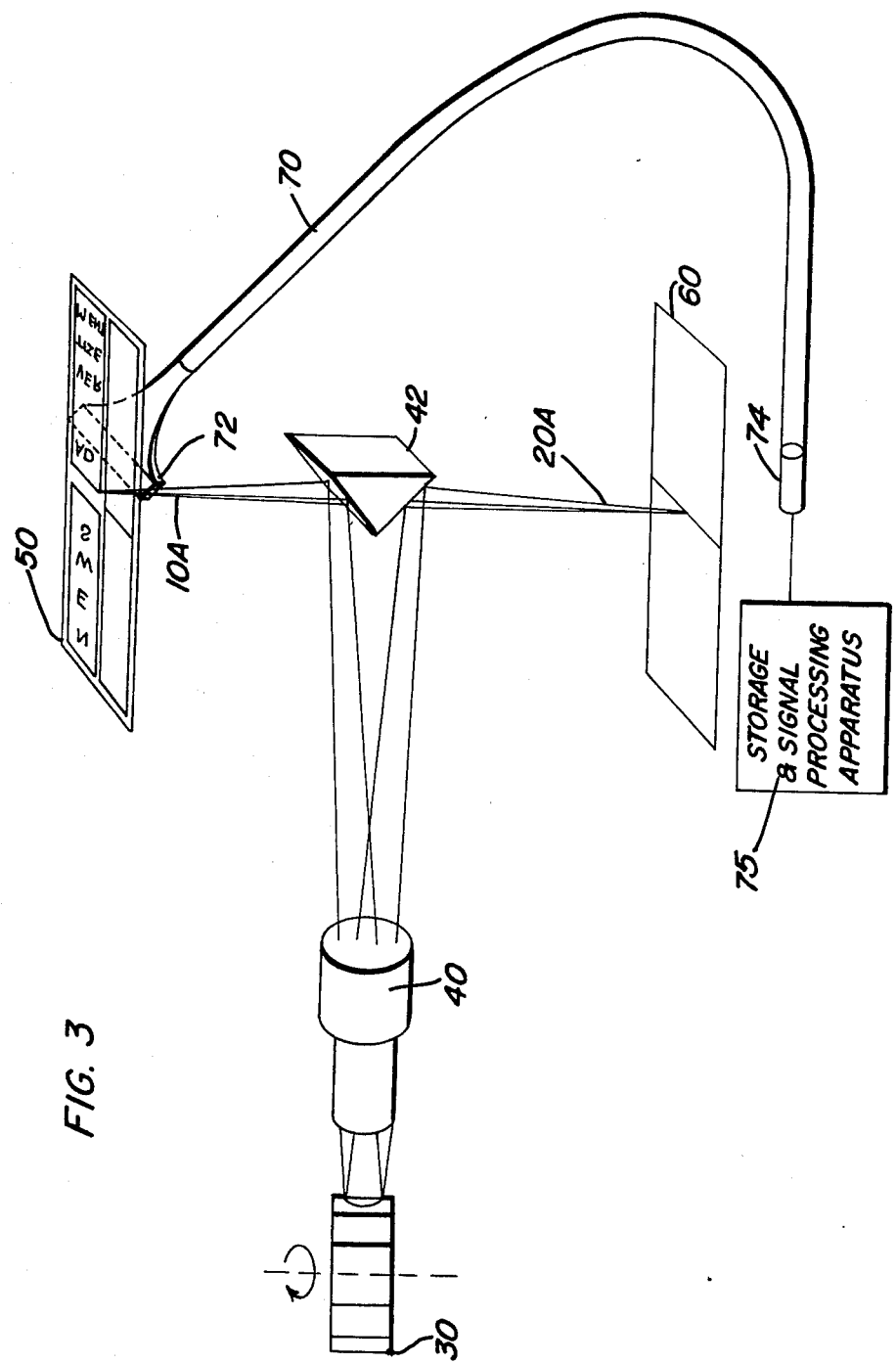
FIG. 3 is a detailed projection view of the scanning means, focusing optics and fiber optic array for a preferred embodiment of the invention.

The interrogating beam directed to the object scan line of planar substrate 50 is selectively absorbed, reflected or transmitted according to the graphic information content of the object to be photographed. Referring to FIGS. 2 and 3, a fiber optic array 70 provides light guide data detection means adjacent the direct scan line. The recording beam 20A is modulated by causing the intensity of the beam to vary substantially in proportion to the intensity of the received radiation. A common beam scanning element 30 is used to cause inherently synchronous operation, whereby an accurate photographic representation of said object is obtained.

Selection of components and their arrangement in the optical system depends upon the type of recording medium being utilized as well as the operating speed, geometric relationships, etc.

An important part of the system involves the means for receiving radiation reflected from the object to be photographed and directing this radiation to a photodetector for conversion to an electrical signal representative of reflected or transmitted radiation.

A fiber optic line-to-spot convertor shown in FIG. 3 may be employed advantageously for this function. A cable 70 comprises a plurality of optical fibers. Each fiber has the property of conducting light by internal reflection. Each fiber has a transparent core of high refractive index such as, glass or acrylic plastic and a thin coating of low refractive index material to achieve total internal reflection, thus preventing escape of light from the fibers between ends. Typically, the fibers are about 70 microns ($\mu$) in diameter and stacked about 750$\mu$ high in an incoherent or random array. The fibers are mounted in a housing 72 which is rectangular with a large aspect radio at one end and circular at the terminal portion 74 adjacent photodetector 75. The cable may be flexible to permit relative movement between the linear ends adjacent the object and the bundle end at the photodetector position. The cable 70 or bundle is spread and fixed to form a linear array 72 of fibers adapted to receive light reflected from the object being scanned in a rectilinear raster pattern. The line of fibers may be fixed by potting or cementing to a support element. The fiber ends are finished, as by polishing, to permit efficient transmission of light from the object to the photodetector. Optical systems employing line-to-spot converters are disclosed in U.S. Pat. Nos. 3,467,774 and 3,739,095. While the object to be photographed may employ reflected light from an opaque document or the like, the fiber optic array may be disposed to receive light transmitted through a transparency.

The fiber optic means for receiving light at the scan line from the object is particularly useful in the present system due to the relatively large amount of light that is transmitted to the photodetector by multiple internal reflections. In FIG. 3 the linear array 72 of fibers disposed adjacent the dihedral mirror deflection means 42 at the scan line, directs the reflected light from the object plane to a point by bringing the output ends 74 of the fiber bundle 70 in an incoherent manner to a remote location adjacent the photodetector 75. A focusing lens can be disposed to receive output light from the bundle terminal and focus the light onto the photodetector 75.

The original document 50 to be reproduced is transported past the fiber optic array 72. The focused beam of laser light is incident on the document at an angle of about 90°. The fiber-optic array is located about 1 cm away from the original document at an angle of 30°–45°. With this orientation, the diffuse reflected laser radiation is detected over a wide solid angle, by a large number of fibers. The signal strength from photodetector 75 is proportional to the total integrated signal over each of the fibers receiving reflected laser light. The annoying laser speckle pattern which contributes to the background noise signal is greatly reduced due to signal integration over a large number of fibers. The signal strength is very high, since the fiber-optic array is close to the target and accumulates reflected light over a large area.

Photodetector 75 may be a semiconductor photodiode, photomultiplier tube (PMT) or other suitable light sensitive transducer. The output of the photodetector may be amplified directly by amplifier 76 to drive modulator 22, or suitable signal processing may be imposed on the output signal, which is representative of light from the object scan line.

The laser source may consist of a single laser or a combined beam from two or more collimated sources of coherent radiation. Since lasers which employ a Brewster window are highly polarized, two such polarized sources of equal wave length can be combined using an optical element which transmits radiation of a first polar orientation and reflects radiation of a second polar orientation. Thus, the energy available for actinic photo-chemical reactions or ablative processes can be increased to sufficient levels for high speed writing in the photosensitive medium. Where combined sources are employed, modulation can be achieved either before or after the combination step.

The modulatable source of actinic laser radiation can be provided by a variety of components. The wavelength of the radiation is chosen to correspond to the particular photosensitive recording medium being utilized. Ultra-violet radiation of about 2600 to 4000 A is useful to initiate numerous chemical reactions, including photopolymerization of curable polymers to make a printing plate directly. Longer wavelength radiation, including visible and infrared waves, may be used in ablative processes to remove or "laser etch" portions of a thin metal layer (e.g. — aluminum) from an optical masking medium.

The means for modulating or switching the laser radiation can employ external or internal cavity modulators. The radiation may be modulated by blocking transmission or deflecting a beam by various electro-optic or acousto-optic transducers. The preferred modulatable laser sources have high contrast between light and dark output. The use of a deflected beam from an acousto-optic modulator permits full modulation between on-off. Quartz cells with piezoelectric transducers may be modulated at frequencies of 1.5 to 3 MHz or higher.

The modulator may be mounted externally to control transmission or deflection of the laser output beam in a known manner. The use of electro-optic switches or modulators is discussed in U.S. Pat. Nos. 3,316,348 and 3,664,737.

In a preferred embodiment, the laser cavity employs folding optics and an acoustic modulator to deflect the beam internally within the cavity. This internally modulated radiation source is described in U.S. Pat. No. 3,720,784 and by Maydam in *Journal of Applied Physics*, Volume 44, No. 4, pp. 1552-9, Mar. 15, 1970, incorporated herein by reference. These souces may have a pulsed or continuous wave output which conserves laser energy otherwise lost in conventional external beam modulation. These devices may be powered by a solid state high frequency RF driver responsive to an electrical signal generated by a photomultiplier tube and amplifier. The pulse duration can be varied from single pulse to 15nsec. with corresponding repetition rates up to 20 MH. A suitable acousto-optic output coupler is the Spectra-Physics Model 365 intracavity modulator, which transforms a CW laser into a high peak power pulsed mode laser.

The output of the photodetector or photocell is a videotype signal which can be amplified proportionally or may be chopped to provide on-off switching of the laser or laser beam through a suitable modulator means. Those modulatable laser sources having internal acousto-optic deflector modulation within the laser cavity are particularly well adapted to on-off modulation at the pulse rates used herein. A pattern of small dots having a size from a few microns up to 50µ spot size or larger can be obtained using these components.

Figure 4:
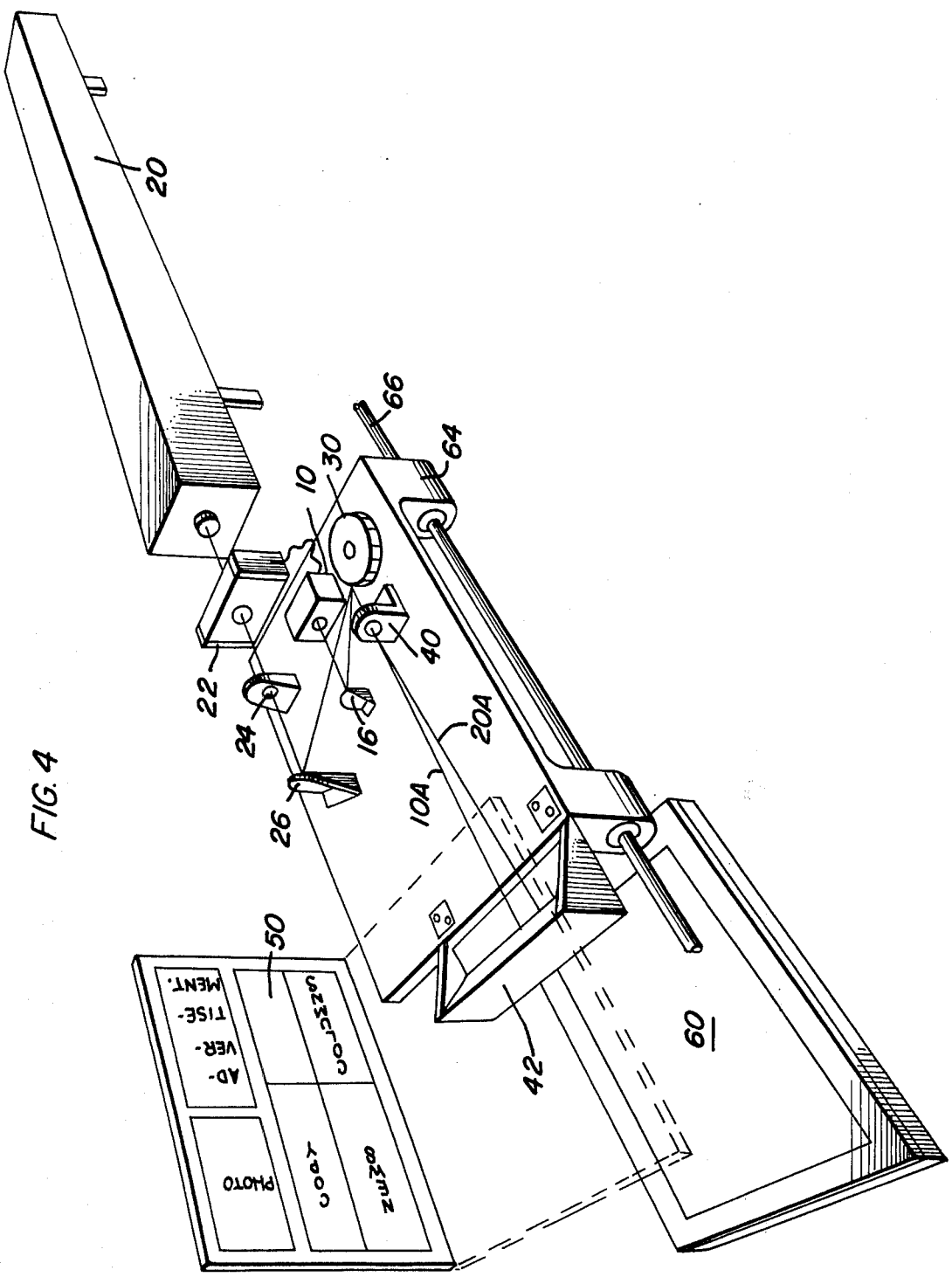
FIG. 4 is a perspective view of a laser scanning assembly showing a movable carriage.

The means for combining the modulated radiation from source 10 with the interrogating beam from source 20 along narrowly converging paths may be provided by a dichroic mirror where the two sources provide different wavelengths of radiation. However, it is possible to have autosynchronous scanning of combined beams of the same wavelength, as shown in the embodiment of FIG. 4. Reading beam 10A from light source 10 is directed toward a common optical deviating means 30 along with beam 20A from laser source 20. Separation of the beams after reflection off the same scanning mirror facet of spinning polygon 30 is effected by angling, the beams off mirrors 26 and 14 to pass along opposite sides of dihedral mirror 42.

Figure 5:
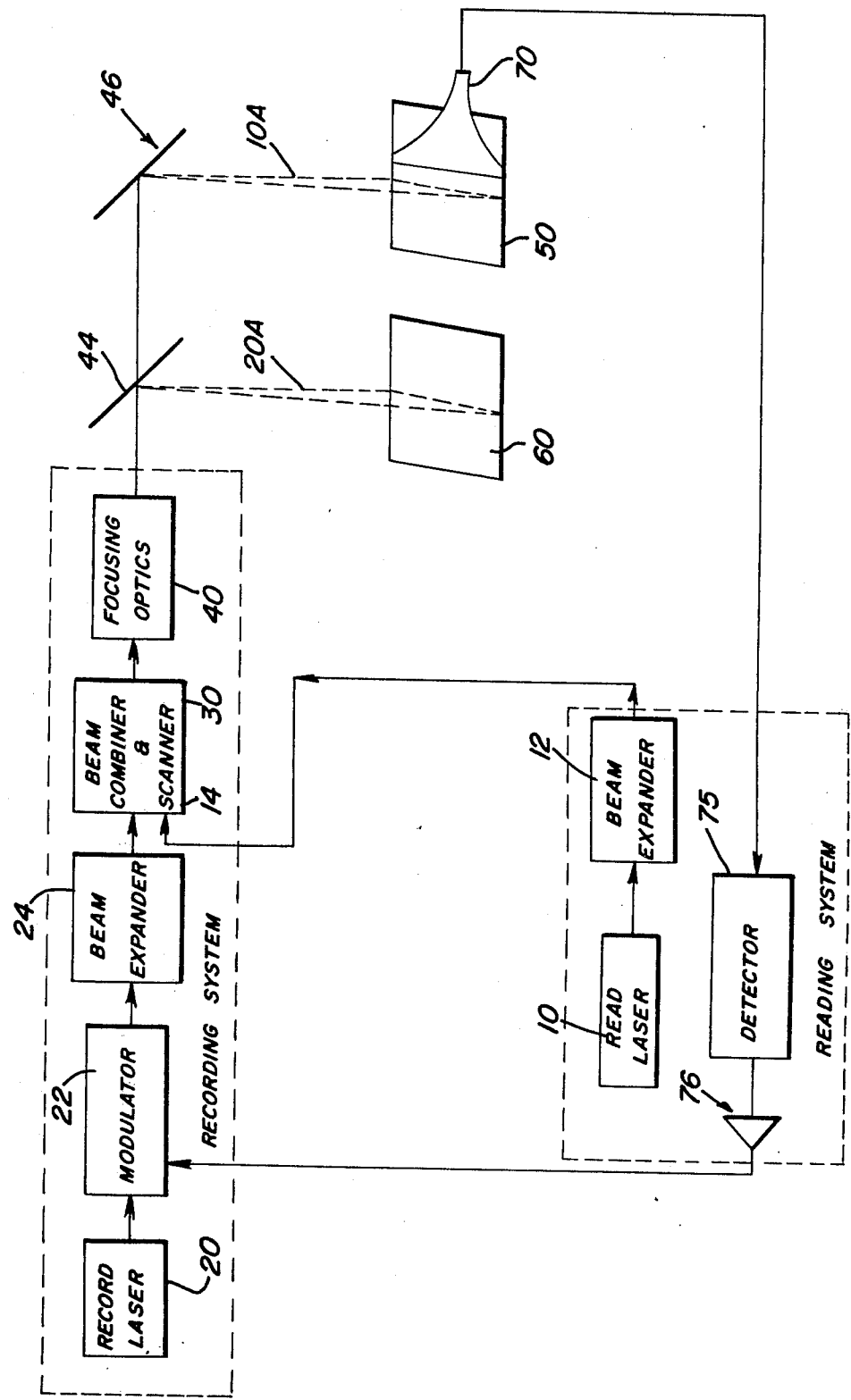
FIG. 5 is a schematic diagram of an alternative embodiment of the invention employing dichroic beam separation means.

An alternative means for separating the combined beams is shown in FIG. 5, wherein beams 10A and 20A are directed from the focusing optics toward a dichroic mirror 44, which has the property of reflecting laser beam 20A (e.g. — ultraviolet radiation) while transmitting interrogating beam 20A (e.g. — visible light). Folding mirror 46 may be used to provide the desired geometric relationship between planar substrates 50 and 60.

In order to obtain synchronous operation of the device, it is advantageous to use common optical scanning and focusing components for both the reading and writing beams. Where the wavelengths are different, the focal length of the read and record laser beams will differ since the focal length of the objective lens is a function of the wavelength according to the design equation:

$$d = 2.44 \frac{f\lambda}{a}$$

where
 $d$ = focused blur spot size
 $f$ = focal length
 $\lambda$ = wavelength
 $a$ = lens aperture or beam diameter By proper selection of beam expanders 12 and 24, flat field objective lens 40 and wavelengths of lasers 10 and 20, the invention allows reduction, or enlargement in the image format of the original document 50 or recording medium 60. This feature is particularly advantageous in the generation of optical masks and printing plates as used by the newspaper printing industry, since the composite page paste-up is generally larger than the printing plate and must be reduced in size accordingly.

The rectilinear raster pattern is formed by the side-to-side scanning motion of the flying laser spot correlated with relative linear motion between the optical sub-system and the object/image planar substrates. The means for providing relative linear motion can be a step motor for advancing the object to be photographed along with the recording surface, as shown in FIG. 1. Alternatively, the object/image planes may be held stationary while the scanning optics sub-system is advanced step-wise, as shown in FIG. 4. In this latter embodiment, a carriage 64 is advanced along a set of parallel tracks 66, aligned with the output beam of laser 20. The planar object 50 and planar recording surface 60 are held stationary in spaced apart parallel facing arrangement. Object plane 50 is shown folded upwardly from the dashed line position for explanatory purposes only.

The linear advance can be controlled by a circuit operatively connected to the scanning mirror motor 32, as shown in FIG. 1.

The optical scan generating device can be constructed from a variety of known optical elements and rotational devices. The rotating regular polygon mirror is preferred because of its accuracy and scanning efficiency. Equally spaced mirror facets provide high equality reflective surfaces for deviating the laser beams. The rotational speed is easily controlled. Those regular polygons having 6 to 12 facets are preferred, with corresponding rotational speeds of about 1,000 to 10,000 revolutions per minute. Alternate beam deflectors include galvanometer mirrors, piezoelectric and torsional mirror deflectors (U.S. Pat. No. 3,426,546), pyramid mirrors, (U.S. Pat. No. 3,316,348 or corner mirror trains (U.S. Pat. No. 3,647,956).

The optical scanning means is mounted to deflect the interrogating and recording beams simultaneously. Where these beams are reflected off the same facet, their geometric relationship can be controlled closely for the horizontal sweep.

A photodetector is disposed to receive scattered light reflected from the document and collected and transmitted by the fiber-optic array, so that the electrical output of the photodetector will correspond to the variations in reflection or transmission density of the information encountered by the scanning spot as it scans the document. The electrical output of the photodetector is suitably amplified and processed and then applied to a modulator to cause switching or amplitude modulation of the recording laser beam, whereby the intensity of the highly focused spot incident on the recording medium will vary in correspondence with the information content or data on the object document to thereby record graphic information on a line-by-line basis.

The successful performance a laser recording system depends upon the quality and availability of the information fed into it. Such information is obtained from the original document by the interrogating scanning laser beam 10A and detector sub-system 70, 75. Satisfactory image quality sometimes can not be attained directly, since the image is subject to diverse signal degrading factors including detector resolution, contrast attenuation, dynamic range, mechanical vibration and system noise present in the electrical feed-back and recording steps. The effect of these factors is to increase the homogeneity of the spatial-luminance distribution, hence reducing image contrast and rendering otherwise resolvable image elements indistinguishable.

The present invention is designed to minimize many of the image degrading factors previously mentioned and to offer sufficiently high signal-to-noise ratio so that electronic image enhancement techniques can be used, if desired, to restore quality to the recorded document. An advantageous technique which can be used in the present invention for restoring image quality is described by R. W. Brainard et al, "Image Quality Inhancement" AMRL-TR-65-28 (1965). Using this signal processing, detection sub-system 70, 75 senses a spatial-density gradient in the original document 50, generates an electrical signal which is proportional to the gradient, and substracts the latter signal from the original image gradient signal. The processed signal drives modulator 22 to give improved resolution, acutance, contrast, and image quality. The aforementioned image enhancement technique requires derivative operation on the electronic feed-back signal, which is inherently a noise amplification process. As shown previously, the laser beam 10A and fiber-optic pick-up 70 generate very high signal-to-noise ratios, and therefore allow derivative signal processing. Hence, it is possible with the present invention to generate a recorded image with quality which exceeds that of the original document to be reproduced.

The above described system provides a novel combination which is capable of converting the output of a laser efficiently into a highly focused flying spot of several microns in diameter. The spot can be scanned controllably to form a two-dimensional rectilinear raster scan pattern in a line by line manner over a flat field. Simultaneous scanning of both interrogating and recording beams with a common optical deviating element generates autosynchronous operation, thereby eliminating expensive and complicated sources of synchronizing signals.

The present invention is particularly useful for making polymeric printing plates, such as letterpress plates, by curing a photopolymerizable coating. A liquid mixture consisting essentially of polyene and polythiol precursors with a photoinitiator or accerator is described in copending U.S. Pat. Application Ser. No. 243,388, filed Apr. 12, 1972, incorporated herein by reference, now U.S. Pat. 3,836,709. The photopolymerization reaction is initiated by actinic light having a wavelength of about 300 to 400 m$\mu$. Various homopolymers and interpolymers of ethylenically unsaturated compounds can be cured by actinic radiation involving free radical initiation.

In addition to those photosensitive materials which involve permanent chemical reactions, various physical changes can be induced by laser radiation, these include electrostatic charge dissipation, ablation of thin films, thermoplastic deformation, and changes in optical properties. Displays employing visible changes in photochromic or liquid crystal materials are feasible. Optical masks or negatives can be made by ablation of thin films of aluminum or bismuth.

The scanning laser system described herein is useful for transferring a graphic design for an electrical circuit board from a drawing to a printed circuit board by additive or substractive methods. A number of different production processes may be utilized for manufacturing electrical circuit boards or microelectronic components with the scanning laser system. One such method employs a photocurable resist coating over a circuit board substrate having a thin metal layer or foil which can be etched after curing the photoresist in selected areas and removing uncured resist material. Conventional electroplating or molten solder processes can be used to increase the thickness of the unetched metal layer after removing the solid resist by solvent. A photosensitive polymer-forming coating containing a catalyst for electroless plating can be laser-cured with the inventive system. Uncured material can be removed along with the catalyst in selected areas, with metal being deposited by conventional electroless methods in those areas of the circuit board where curing is effected by the scanning laser.

The graphic display or recording sub-system may employ a direct image or a reverse image. So called wrong-reading mode, such as shown in the configuration of FIG. 1 with the object and image planes in spaced apart facing arrangement on opposite sides of the rectilinear scan deflector provides a "wrong-reading" plate, which can be used in making letterpress printing plates with a polymeric relief pattern for direct impression of a printed surface. The "right-reading"

mode, such as used in offset printing may be obtained using a configuration of optical elements similar to the system in FIG. 5.

While the invention has been described by reference to particular examples, there is no intent to limit the inventive concept except as set forth in the following claims.

What is claimed is:

1. In a scanning and recording device for making an image of an object including;
   means for simultaneously linearly advancing the object and a photosensitive recording surface disposed in parallel spaced apart facing arrangement on opposite sides of a rectilinear scan deflector means;
   means for providing a first modulatable beam of coherent laser radiation;
   means for providing a second beam of focusable radiation;
   optical scanning means for receiving said first and second beams and for causing said beams to be directed along narrowly divergent paths toward said rectilinear deflector means and then directing said first beam toward said photosensitive surface while simultaneously directing said second beam toward said object in cooperation with said advancing means to form a simultaneous rectilinear scanning raster pattern of said beams across said surface and said object respectively;
   said optical scanning means further comprising flat field lens means to simultaneously focus both beams;
   photodetector means for receiving radiation from the object and for generating an electrical signal representative of said radiation;
   means responsive to said electrical signal for modulating said first beam; and
   a fiber optic line-to-spot converter having a plurality of internally-reflecting light-transmitting fibers arranged in a linear array adjacent the rectilinear scan deflector means to transmit radiation from the object to the photodetector means.

2. A device according to claim 1 wherein said optical scanning means comprises:
   means for combining said first and second beams along narrowly converging paths;
   said optical scanning means comprising mirror means; and
   means for directing said combined beams toward said mirror means and by reflection from said mirror means toward said flat field lens means.

3. The device of claim 1 wherein:
   said photosensitive recording surface comprises a planar substrate at a normal angle and in said rectilinear raster; and
   means for mounting the object in opposing planar position above said substrate for motion together with said substrate.

4. A device according to claim 1, wherein said first beam comprises actinic laser light having an ultraviolet wavelength and said second beam comprises visible light for reading the object.

5. A device according to claim 4 wherein said optical scanning means comprises:
   dichroic means for reflecting one of said beams while transmitting the other of said beams to separate said combined first and second beams.

6. The device of claim 1, said optical scanning means comprising:
   a regular polygonal mirror structure having a plurality of equally spaced mirrors and means for rotating said polygonal mirror structure at a constant rate.

7. The device of claim 6 including means for reflecting said first and second beams simultaneously from a single mirror facet.

8. The device of claim 1 wherein the flat field lens means has a non-uniform focal length and includes:
   means for focusing scanned beams as a uniform spot of above $50\mu$ size in said rectilinear raster on said photosensitive surface and on said object.

9. The device of claim 8 further comprising means for correlating said optical scanning means and said advancing means to obtain a raster line width of about $50\mu$.

10. A system for imaging an object comprising:
    means for producing a first bright narrow beam of radiant energy;
    first deviating means for causing said radiant energy beam to scan the object in a rectilinear raster pattern;
    fiber optic means for receiving radiant energy from said object and for transmitting said energy;
    signal producing means adapted to receive said transmitted energy and to produce a signal proportional thereto;
    means for producing a second beam of laser radiation;
    modulating means responsive to said signal producing means for causing the intensity of said laser beam to vary substantially as a function of said received radiant energy;
    and second deviating means for causing said laser beam to scan a photosensitive medium in a raster pattern similar to that caused by said first deviating means;
    said first and said second deviating means comprising at least one common major component to effect synchronous operation;
    whereby an accurate image of said object is created on said photosensitive medium.

11. A method for optically scanning an object which comprises: generating a collimated beam of scanning energy;
    directing the beam to an optical deviating means for scanning the beam across the object;
    focusing the beam from the optical deviating means to form a straight line scan side-to-side across the object;
    providing relative linear motion between the object and the optical deviating means to form a rectilinear raster pattern;
    receiving light from the object adjacent the scan line and transmitting said received light by multiple internal reflection to a signal means responsive to said light;
    generating an electrical signal representative of said received light from the object;
    generating a recording beam of energy and optically deviating said beam using said optical deviating means;
    focusing the recording beam to form a rectilinear scan line across a photosensitive recording medium;

providing a rectilinear raster pattern of the recording beam in coordination with the object pattern;

modulating the recording beam as a function of the electrical signal to record a facsimile of the object in the photosensitive medium;

wherein the steps of directing and deviating said scanning and recording beams includes the use of at least one common reflective element of said optical deviating means; and wherein the steps of focusing said beams include the use of at least one common lens means.

12. The method of claim 11 further comprising the step of: providing a fiber optic line-to-spot converter for transmitting said light received from the object to said signal means.

13. The method of claim 11 wherein the recording medium consists essentially of a photoresist coating on a circuit board substrate.

14. The method of claim 11 further comprising the step of modulating the recording beam by driving an acousto-optic modulator in response to the electrical signal.

15. The method of claim 11 which further comprises the step of recording a relief pattern in a photocurable polymer recording medium wherein the recording beam includes ultra violet radiation.

16. The method of claim 15 wherein the polymeric medium consists essentially of the photo-reaction product of a polyene and a polythiol.

17. The method of claim 11 further comprising the step of: directing the beams toward a common scanning mirror surface and thence through a flat field lens to provide autosynchronous scanning of said scanning energy beam and said recording beam.

18. The method of claim 17 including the steps of:
disposing the object and recording medium in spaced apart facing planar relationship;
directing the scanning energy beam and recording beam from the scanning mirror and flat field lens at narrowly diverging angles toward a dihedral mirror between the object and recording medium;
directing the scanning energy beam at a substantially perpendicular angle from the dihedral mirror toward the object;
directing the recording beam at a substantially perpendicular angle from the dihedral mirror in a direction essentially opposite to the scanning energy beam toward the recording medium; and
moving the object, the recording medium, and the optical deviating means together parallel to the optical axis through the flat field lens to form a rectilinear raster pattern.

19. The method of claim 18 wherein the photosensitive recording medium consists essentially of an ablative medium comprising a thin uniform metal coating on a transparent substrate.

20. A laser recording system including a source of coherent radiation comprising an acousto-optic modulator disposed in a laser cavity, said modulator deflecting said coherent radiation in response to an electrical signal;
means for directing an expanded and modulated coherent recording beam from said source of coherent radiation together with an interrogating beam;
multi-faceted polygon mirror scanning means adapted to scan said interrogating beam and said recording beam simultaneously;
means for focusing the scanned interrogating beam in a linear spot sweep position along an object plane perpendicular to an optical axis through said polygon mirror;
means for focusing the scanned recording beam in a linear spot sweep position along an image plane perpendicular to said optical axis and parallel to said object plane;
means for detecting interrogating beam radiation directly adjacent the linear sweep position of the object plane and generating an electrical signal representative of said detected radiation; and
optical means for feeding back said electrical signal to operate said modulator.

21. An optical scanning and recording system comprising:
an object to be recorded and a photosensitive image recording medium;
a first source for a modulatable beam of coherent radiation;
a second source for a second beam of radiation;
means for combining said first and second beams of radiation;
optical scanning means disposed to receive said combined first and second beams of radiation to provide autosynchronous deflection of said first and second beams of radiation;
means for directing said first beam toward a photosensitive medium;
means for directing said second beam toward the object to be recorded;
means for creating relative linear motion along the scanning means axis between the object and the photosensitive medium, and the optical scanning means;
flat field lens means disposed to receive radiation from said optical scanning means and to focus said first and second beams of radiation to form diffraction-limited spots along scan lines corresponding to object and image planes;
means for separating said first and second beams of scanned and focused radiation and means to direct said first and second beams of scanned and focused radiation along separate paths, whereby said first beam of radiation scans the image plane and said second beam scans the object plane;
internal reflection means disposed to receive radiation from the object; photodetector means for generating an electrical signal which varies substantially in proportion to the intensity of radiation received from said internal reflection means; and
electrical processing means responsive to the electrical signal for generating an electrical signal for modulating said first beam intensity, whereby data representative of the imagery content of said object is recorded.

22. A recording system comprising a flat object plane and a flat recording plane,
a first beam to interrogate said object plane, a second beam to record an image of the object plane in the recording plane,
means to simultaneously scan said first and second beams across their respective planes, said scanning means including mirror means which simultaneously reflects said first and second beams, flat field lens means to simultaneously focus said beams onto their respective flat planes, means to modulate said recording beam, and fiber optic feedback means adapted to detect a spot on said object plane struck by said interrogation beam and to modulate said recording beam in its striking the corresponding spot in said recording plane, whereby a spot by spot accurate image of said object is created in said recording plane.

23. The combination of claim 22, wherein said mirror means comprises a rotating polygon mirror, and wherein said first and second beams are simultaneously reflected from a single facet of said rotating polygon mirror to thereby generate a line of spots in said scan.

24. The combination of claim 22, wherein said interrogating beam comprises visible light and said recording beam comprises laser light.

25. The combination of claim 22 and a carriage, means to mount said planes in spaced apart parallel relation to each other,
means to move said carriage along a line parallel to and between said planes, said scanning means comprising raster scanning means at least partially mounted on said carriage and formed by said linear carriage motion means together with said mirror means which sweeps both said beams in a plane parallel to said object and recording planes, said scanning means comprising means to direct said beams onto said mirror means along narrowly convergent angles and thence off said mirror means along narrowly divergent angles, and deflection means on said carriage adapted to separate and reflect said beams onto their respective planes.

26. The combination of claim 22, said fiber optic feedback means comprising a line-to-spot converter bundle,
means to mount the line array end of said bundle in closely spaced relation to the portion of said optic plant being struck by said interrogating beam, whereby each spot struck by said interrogating beam in said object plane is detected by a relatively large number of the fibers in said bundle.

27. A method of making an image of a flat object plane in a flat recording plane comprising the steps of generating an interrogating beam and a recording beam, simultaneously focusing both said beams with a single flat field lens means before directing said beams onto their respective planes, simultaneously scanning both said beams over their respective planes, detecting each spot in said object plane struck by said interrogating beam with a plurality of fibers in the line end of a fiber optic line to spot converter, directing the detected light from said converter into integrating and signal producing means, and modulating said recording beam when it strikes each corresponding spot in said recording plane with said signal produced by the corresponding spot in said object plane.

28. The method of claim 27, wherein said scanning step is a raster scan formed by relative motion of said beams with respect to said planes together with simultaneous sweeping motion of both said beams reflected from a single mirror.

29. A method of making an image of a flat object plane in a flat recording plane comprising the steps of generating an interrogating beam and a recording beam, simultaneously focusing both said beams with a single flat field lens means before directing said beams onto their respective planes, scanning both said beams over their respective planes, detecting each spot in said object plane struck by said interrogating beam with a plurality of fibers in the line end of a fiber optic line to spot converter, directing the detected light from the spot end of said converter into integrating and signal producing means, and modulating said recording beam when it strikes each corresponding spot in said object plane.

30. The method of claim 29, wherein said scanning step is an autosynchronous raster scan of both said beams over their respective planes formed by relative motion of said beams with respect to said planes together with simultaneous sweeping motion of both said beams reflected from a single mirror.

31. A method which comprises the steps of:
generating a beam of scanning energy and a beam of recording energy;
directing the beams to an optical deviating means for scanning the beams together;
focusing the beams from the optical deviating means;
separating the beams;
directing the scanning beam to an object plane and the recording beam to a photosensitive recording medium plane;
providing relative motion between said planes and the optical deviating means to form rectilinear raster pattern;
receiving light from the object plane adjacent the scan line;
transmitting said received light by multiple internal reflection to a signal means responsive to said light;
generating an electrical signal representative of said received light from the object;
and modulating the recording beam using said electrical signal to record a facsimile of the object in the photosensitive medium.

32. The method of claim 31 further comprising the step of providing a fiber optic line-to-spot converter for transmitting said light received from the object to said signal means.

33. The method of claim 31 further comprising the step of modulating the recording beam by driving an acousto-optic modulator in response to the electrical signal.

34. The method of claim 31 wherein said medium comprises a photocurable polymer recording medium, and wherein the recording beam includes ultra violet radiation.

35. The method of claim 34 wherein the polymeric medium consists essentially of the photo-reaction product of a polyene and a polythiol.

36. The method of claim 31, further comprising the step of directing the beams toward a common scanning mirror surface and thence through a flat field lens to provide autosynchronous scanning of said scanning energy beam and said recording beam.

37. The method of claim 36 including the steps of:
disposing the object and recording planes in spaced apart facing relationship;
directing the scanning energy beam and recording beam from the scanning mirror and flat field lens at narrowly diverging angles toward a dihedral mirror between the object and recording medium;
directing the scanning energy beam at a substantially perpendicular angle from the dihedral mirror toward the object;
directing the recording beam at a substantially perpendicular angle from the dihedral mirror in a direction essentially opposite to the scanning energy beam toward the recording medium; and moving the object, the recording medium, and the optical deviating means together parallel to the optical axis through the flat field lens to form a rectilinear raster pattern.

38. The method of claim 37 wherein the photosensitive recording medium consists essentially of an ablative medium comprising a thin uniform metal coating on a transparant substrate.

39. The method of claim 37 wherein the photosensitive recording medium consists essentially of a photoresist coating on a circuit board substrate.

* * * * *